(12) United States Patent
Moseley et al.

(10) Patent No.: US 6,611,243 B1
(45) Date of Patent: *Aug. 26, 2003

(54) DIRECTIONAL DISPLAY

(75) Inventors: Richard Robert Moseley, West Sussex (GB); Graham John Woodgate, Henley-on-Thames (GB); David Ezra, Wallingford (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/674,903

(22) PCT Filed: May 11, 1999

(86) PCT No.: PCT/JP99/02434

§ 371 (c)(1),
(2), (4) Date: Jan. 8, 2001

(87) PCT Pub. No.: WO99/59021

PCT Pub. Date: Nov. 18, 1999

(30) Foreign Application Priority Data

May 12, 1998 (GB) .............................................. 9810034

(51) Int. Cl.⁷ ................................................. G09G 5/00
(52) U.S. Cl. ..................... 345/4; 345/5; 345/9; 348/51; 348/59; 349/112
(58) Field of Search ........................... 345/4–9; 348/51, 348/59, 42; 349/112, 15, 139

(56) References Cited

U.S. PATENT DOCUMENTS

| 5,392,140 A | * | 2/1995 | Ezra et al. .................. 349/112 |
| 5,991,073 A | * | 11/1999 | Woodgate et al. ........... 359/462 |
| 6,008,484 A | * | 12/1999 | Woodgate et al. ....... 250/201.1 |
| 6,014,164 A | * | 1/2000 | Woodgate et al. ............. 348/42 |
| 6,271,896 B2 | * | 8/2001 | Moseley et al. ............... 348/51 |
| 6,327,013 B1 | * | 12/2001 | Tombling et al. ........... 349/139 |
| 6,377,295 B1 | * | 4/2002 | Woodgate et al. ............. 348/59 |
| 6,473,141 B2 | * | 10/2002 | Moseley et al. .............. 349/15 |

FOREIGN PATENT DOCUMENTS

| EP | 0 570 179 A2 | 11/1993 |
| EP | 0 764 869 A2 | 3/1997 |
| EP | 0 833 183 A1 | 4/1998 |
| GB | 2 272 555 A | 5/1994 |
| GB | 2 317 295 A | 3/1998 |
| GB | 2 317 710 A | 4/1998 |
| GB | 2 320 156 A | 6/1998 |

* cited by examiner

Primary Examiner—Bipin Shalwala
Assistant Examiner—Prabodh Dharia
(74) Attorney, Agent, or Firm—Renner, Otto, Boisselle & Sklar

(57) ABSTRACT

An autostereoscopic 3D display includes a spatial light modulator, for instance of the liquid crystal display type. A backlight and a mask form a plurality of light sources which are imaged by a lenticular screen at first notional viewing windows. A parallax barrier controls the visibility of pixels of the spatial light modulator to form second notional viewing windows. The display forms actual viewing windows whose lateral extent is equal to the product of the lateral extents of the first and second viewing windows and is less than each of these lateral extents.

16 Claims, 11 Drawing Sheets

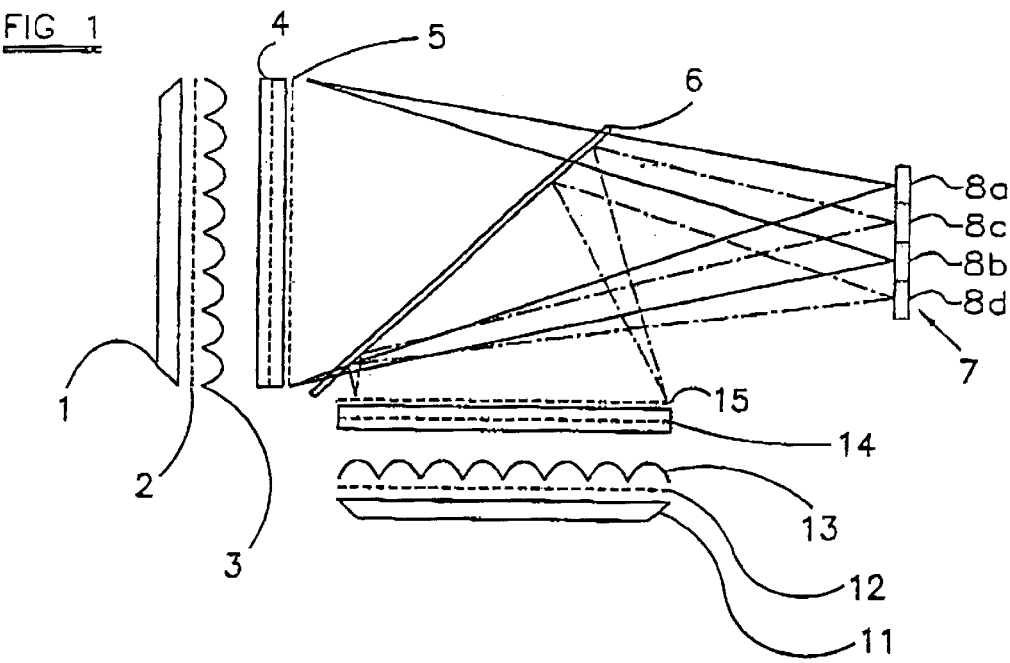
FIG_1
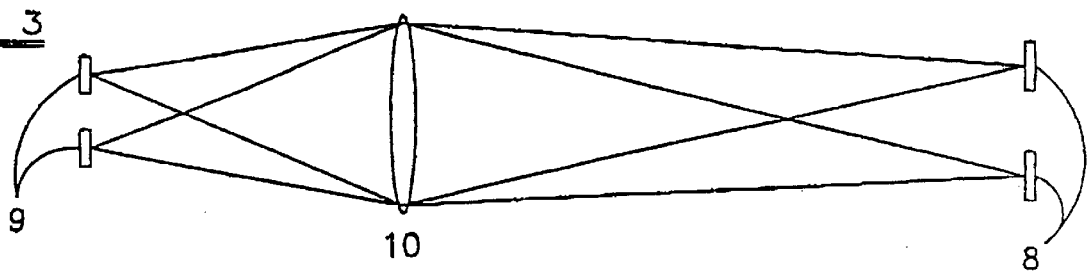
FIG_3
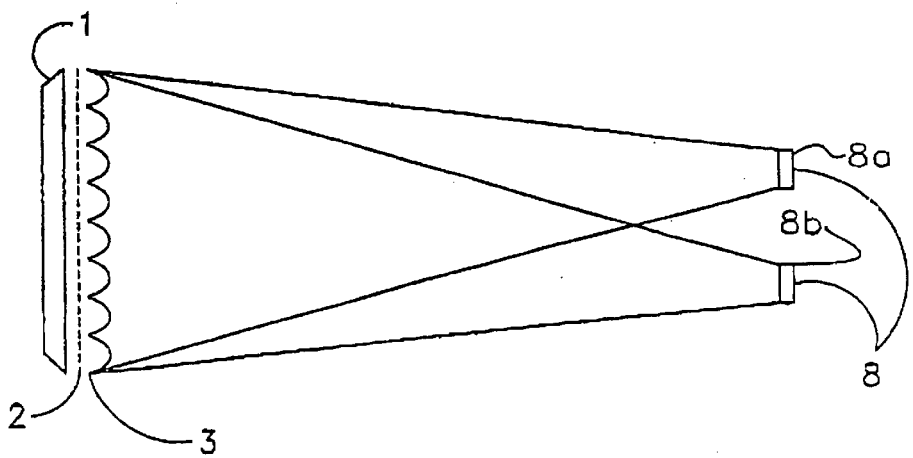
FIG_2

Optional reflective rear surface of mask to re-cycle light

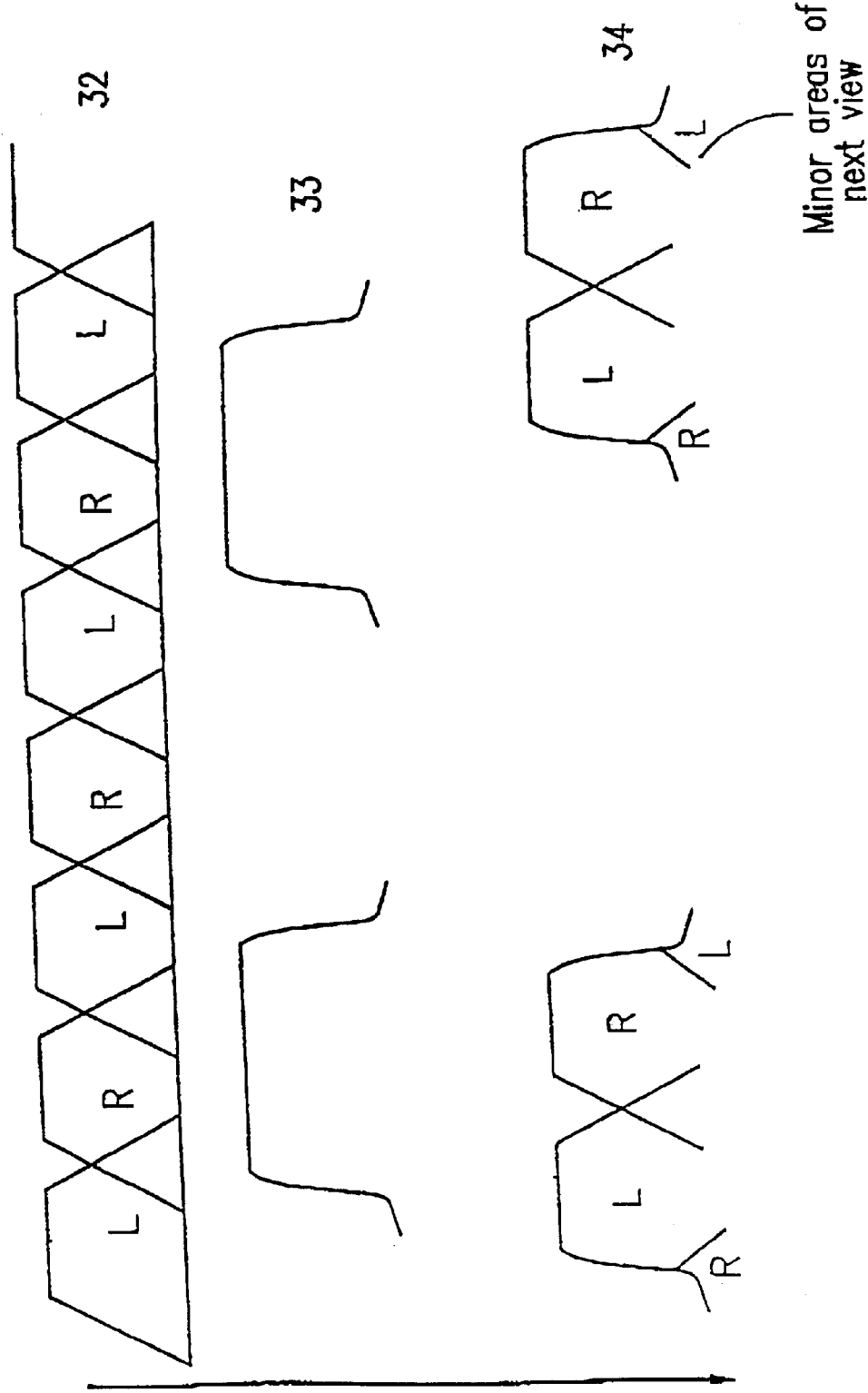

DIRECTIONAL DISPLAY

TECHNICAL FIELD

The present invention relates to a directional display, for instance for use as a three dimensional (3D) display. Such displays may be used in: professional displays, for instance in office environments; entertainment systems such as 3D video games; 3D television; medical imaging; virtual reality; and design visualization.

BACKGROUND ART

EP 0 656 555 discloses an observer tracking twin-panel display of the autostereoscopic 3D type. This display makes use of a beamcombiner to combine the outputs of two individual optical systems.

EP 0 726 482 and GB 2 297 876 disclose an autostereoscopic 3D display in which observer tracking is achieved by electronically changing the view information displayed by spatial light modulators. By changing the view information in response to movements of an observer, the observer can be tracked laterally while ensuring that the correct views are perceived by the individual eyes of the observer.

EP 0 721 131 and GB 2 296 617 disclose a similar type of observer tracking autostereoscopic 3D display but with the ability to track longitudinal movements of an observer. In this case, longitudinal observer movements are tracked by changing the view information in vertical slices of varying width.

For such lateral and longitudinal tracking displays, the viewing windows must be uniform and contiguous. Also, the width of the viewing windows is important. In a three-view system, the window width should be two thirds of the average inter-ocular separation whereas, in a four-view system, the window width should be half the inter-ocular separation. The appropriate viewing conditions for such displays may be achieved using spatial light modulators of the type disclosed in EP 0 625 861. However, such displays have various disadvantages. For instance, the image resolution is relatively low, in particular less that a third of the spatial resolution of the spatial light modulator for each image. Further, high manufacturing tolerances are required in order to avoid visible artifacts at the boundaries of viewing windows. Complicated interlacing of the images is required on the spatial light modulators. In order to provide a spatial light modulator of this type, a custom liquid crystal display (LCD) has to be manufactured or a conventional LCD panel, for instance of the delta type, has to be modified.

EP 0 947 208 and GB 2 320 156 disclose flat panel autostereoscopic 3D displays in which two parallax elements are used to improve the uniformity of viewing windows. One of the parallax elements defines the viewing windows but creates non-uniformities within the windows, for instance because of diffraction. The other parallax element introduces inverse illumination non-uniformities for canceling or reducing the undesirable optical effects of the first parallax element. The second parallax element does not modify the width or information content of the viewing windows and may be embodied as a gray-scale mask element. The embodiment shown in FIG. 30 of GB 2 320 156 discloses a directional illumination system in which a backlight and mask form a plurality of light sources which are imaged by a lenticular screen to form viewing windows.

It can be difficult for inexperienced observers of autostereoscopic 3D displays to position themselves correctly with respect to the viewing windows or viewing zones. EP 0 860 728 and GB 2 321 815 disclose a flat panel autostereoscopic 3D display which incorporates a visual position indicator integrated with a parallax element. This provides a relatively simple visual indication to the observer of correct and incorrect observer position with respect to the viewing zones or viewing windows.

EP 0 829 744, GB 2 317 295, EP 0 887 666 and GB 2 326 728 disclose parallax barriers which are suitable for use in directional displays and which permit different modes of operation to be achieved. Such a parallax barrier comprises polarization modifying strips for defining the slits of the parallax barrier separated by regions which do not affect the polarization of incident light. A separate removable uniform polarizer is provided. A further uniform polarizer is required and may be provided by an input or output polarizer of a spatial light modulator, such as an LCD. With the removable polarizer in place, a parallax barrier is formed to provide a 3D viewing mode. When the removable polarizer is removed from the optical path, the polarization modifying strips and the separating regions act as a uniformly transparent optical element for a 2 dimensional (2D) viewing mode.

Mashitani, "Autostereoscopic LCD image splitter displays", Optics Design number 12, pp 36–41 (the Optical Society of Japan, 1997) discloses a single-panel 3D display comprising an LCD with front and rear parallax barriers. The two parallax barriers cooperate to produce viewing zones having less overlapping edge regions than is produced by a single parallax barrier arrangement. This arrangement required non-directional illumination.

This arrangement narrowly constrains the profiles of the windows at the viewing plane so that the brightness of the displayed images is reduced and increased intensity variations are perceived as an observer moves by relatively short lateral distances with respect to the display. Also, the pitches of the parallax barriers are required to be substantially the same as the pixel pitch of the LCD. This requires high tolerance of alignment and manufacture and results in increased cost.

Nose et al, "Rear-lenticular 3D-LCD without eyeglasses", 3D Image Conference 1997, pp219–224 discloses a 3D display in which a horizontal parallax system and a vertical parallax system cooperate to allow autostereoscopic 3D viewing from a single LCD panel in viewing zones restricted horizontally with the images interlaced in adjacent rows of picture elements (pixels) on the LCD. This arrangement simplifies the interface to the LCD by permitting two images to be displayed as the interlaced fields of the standard interlaced video format. The horizontal parallax system defines both the information content of viewing regions and, in combination with the vertical parallax system, the form of the viewing regions. Directional illumination is required and is effectively split into two sub-systems, with light from each sub-system passing through parts of the display to define the information content of the viewing zones. Thus, the directional illumination is effectively divided into two spatially multiplexed systems, each of which is only associated with some of the pixels of the LCD.

This arrangement also suffers from the disadvantage of requiring alignment of the optical elements substantially at the pixel pitch of the LCD. Further, a lenticular screen is required with the pitch of the lenticules being substantially equal to the LCD pixel pitch. Lenticular screens are difficult and expensive to manufacture with the tolerances required to achieve accurate alignment with LCD structures, particularly when compared with parallax barriers which may be made to high tolerances using standard photographic or lithographic techniques.

GB 2 252 175 discloses a single panel autostereoscopic 3D display using a double parallax barrier arrangement. This arrangement comprises two separate barrier sheets working together to define broad illumination regions with non-illuminated regions separating them. In this way, pseudoscopic viewing zones can be avoided. However, such an arrangement also suffers from spreading of the edges of the window profile illumination resulting in perceptible variations in image brightness as an observer moves laterally. Also, such an arrangement cannot provide a 2D viewing mode.

GB 2 317 710 discloses a directional display in which a lenticular screen is associated with an active mask arrangement forming a rear parallax barrier. The combination may be considered to act as a directional light source which illuminates an associated spatial light modulator. However, no parallax optic is associated with the spatial light modulator.

GB 2 272 555 discloses what is known as a "hybrid sandwich" type of stereoscopic display. The hybrid sandwich comprises a spatial light modulator having input and output parallax optics. The input parallax optic effectively images the light sources at a diffuser within the sandwich and so does not act as a directional illumination system.

EP 0 570 179 discloses a similar arrangement in which a hybrid sandwich is associated with a directional light source. However, the directional light source merely serves to alter the direction of input illumination to the hybrid sandwich.

DISCLOSURE OF THE INVENTION

According to the invention, there is provided a directional display including a spatial light modulator, a directional illumination system for directing light through the modulator, and a parallax optic associated with the modulator, wherein: the illumination system directs light towards a plurality of first notional viewing windows, each of which has a first lateral extent; the parallax optic cooperates with the modulator so that non-directional illumination of the modulator would result in the formation of second notional viewing windows, each of which has a second lateral extent; and the modulator, the illumination system and the parallax optic cooperate to form actual viewing windows, each of which has a lateral extent which is equal to the product of the first and second lateral extents and is less than each of the first and second lateral extents.

The term "lateral extent of a viewing window" means the lateral width for which the light intensity (for a maximally white image) is greater than x % of the peak intensity of the window, where x is less than 100. In theory, x can have any value less than 100 but, in practice, values of x which are so low as to be affected by stray light, crosstalk, etc. should be avoided.

The illumination system may include at least one illumination source and an imaging system.

The illumination system may include a plurality of discrete light sources.

The imaging system may include a field lens.

The illumination system may include a backlight and a mask having a plurality of slits defining the illumination sources. Regions of the mask between the slits may be reflective towards the backlight. The imaging system may comprise a lenticular screen. Each lenticule of the lenticular screen may cooperate with a group of the slits to image the slits in a plurality of lobes in respective viewing windows.

The imaging system may include at least one holographic optical element. The illumination source may comprise a collimated light source.

The viewing windows may be laterally contiguous.

The viewing windows may include laterally spaced pairs of laterally contiguous viewing windows.

The parallax optic may include a parallax barrier.

The spatial light modulator may include a first and second spatial light modulators, the parallax optic may include first and second parallax optics cooperating with the first and second spatial light modulators, respectively, and the display may include a beamcombiner for combing out put light from the first and second spatial light modulators. The illumination system may include a plurality of discrete light sources and a beam splitter for directing light from the light sources towards the first and second spatial light modulators.

The display may include a switchable diffuser cooperating with the spatial light modulator and switchable between a non-diffusing state to provide a directional display mode and a diffusing state to provide a non-directional display mode.

It is thus possible to provide a directional display in which directional illumination creates illumination zones with light passing through the whole area of a directional display panel. The directional display panel defines the image information content visible in the whole or part of the illumination zones. By using imaging optical elements to provide the directional illumination, improved illumination zone profiles can be achieved such that uniform illumination is provided in a central part of the illumination zone and the zone has sharp edges. The use of a parallax optic such as a parallax barrier to define the information content of the zones provides low levels of crosstalk.

It is further possible to provide an electronically tracked autostereoscopic 3D display of the beamcombiner type. Such an arrangement requires no moving parts and results in little or no visual flicker artifacts during observer tracking. A four-window system can be provided for enhanced tolerances during tracking, for instance compared with a three-view system as disclosed in EP 0 726 482, EP 0 721 131, GB 2 297 876 and GB 2 296 617. Longitudinal tracking by means of view slicing can be provided and fast observer tracking at video input rates can be achieved. An image resolution equal to half the spatial resolution of the spatial light modulator can be provided. The spatial light modulator may be embodied by standard liquid crystal displays without requiring any modification. Such an arrangement can make use of the same display interfacing as other flat panel two-view interlaced displays. In the case of a parallax barrier as the parallax optic, wide slits may be adopted so as to improve light efficiency and reduce diffraction effects. All of the elements may be fixed in position during manufacture so as to provide a rugged display. Stereoscopic and 2D modes of operation may easily be provided in some embodiments.

It is possible to eliminate pseudoscopic viewing regions, for instance for fixed observer position to two-view autostereoscopic displays. Such arrangements can have reduced crosstalk and may be electronically switchable to a 2D mode. Further, it is not necessary to provide any viewer position indication because even inexperienced observers have no substantial difficulty in correctly locating themselves with respect to the viewing regions.

BRIEF DESCRIPTION OF THE DRAWINGS

The invention will be further described, by way of example, with reference to the accompanying drawings, in which:

FIG. 1 is a diagrammatic plan view of an autostereoscopic 3D display constituting a first embodiment of the invention;

FIG. 2 is a diagrammatic plan view of a directional illumination system of the display of FIG. 1;

FIG. 3 is a diagrammatic plan view of another type of directional illumination system which may be used in the display of FIG. 1;

FIG. 14 illustrates the optical performance of the display of the FIG. 13;

Like reference numerals refer to like parts throughout the drawings.

BEST MODE FOR CARRYING OUT THE INVENTION

Figure 4:
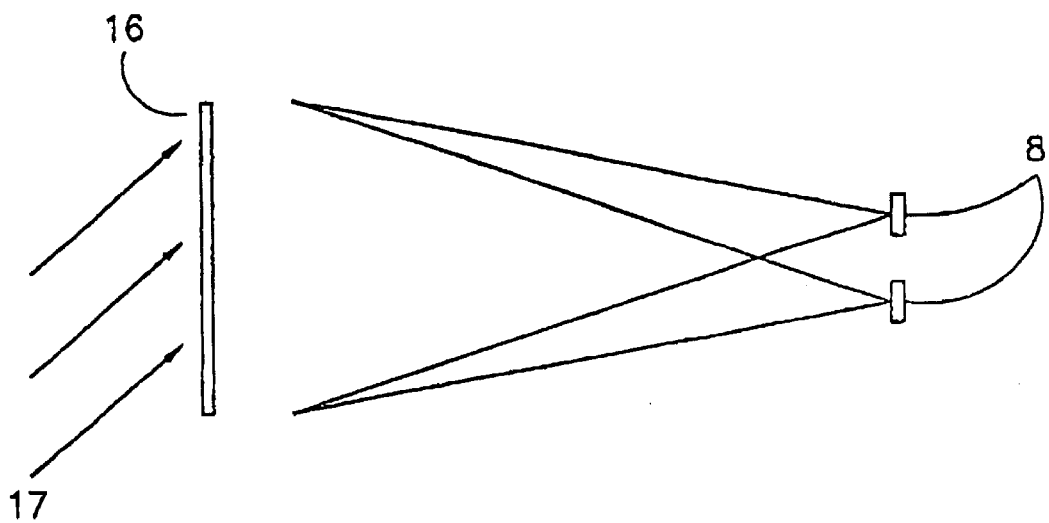
FIGS. 4a and 4b are diagrammatic plan views of holographic-based directional illumination systems which may be used in the display of FIG. 1.
Figure 4:
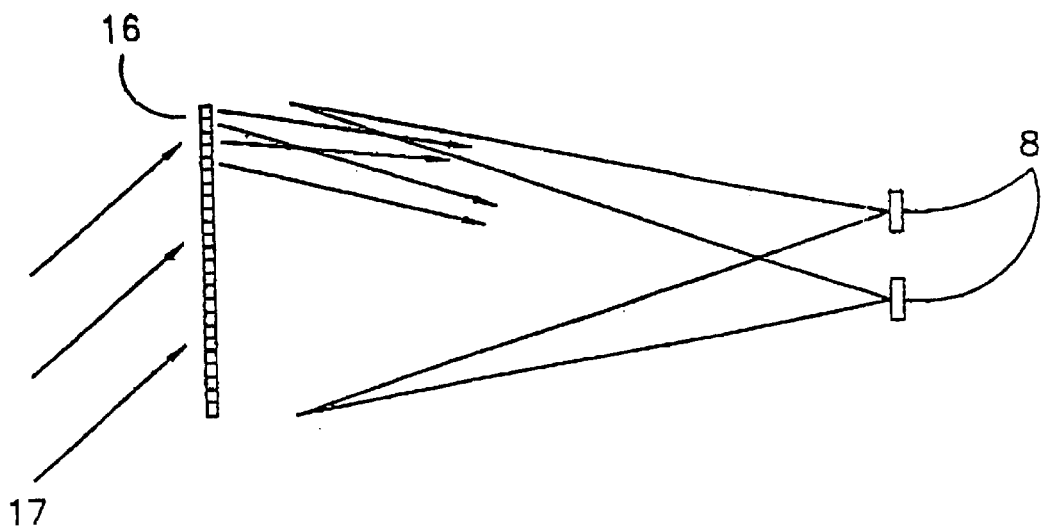

The autostereoscopic 3D display shown in FIG. 1 is of the beamcombiner type using compact illumination systems. The display comprises a backlight 1 disposed behind a mask set 2 in the form of an opaque layer having formed therein vertically extending parallel slits which act as individual light sources. A lenticular sheet 3 is disposed in front of the mask set 2 and comprises a plurality of vertically extending parallel cylindrically converging lens elements or lenticules. Each of the lenticules is disposed above a group of two of the slits of the mask set 2 (This is not explicitly shown in FIG. 1 and in subsequent figures, which are schematic in this respect). The devices 1, 2 and 3 form a compact illuminator.

A spatial light modulator (SLM) 4 is disposed in front of the compact illuminator 1,2,3 and comprises, for example, a liquid crystal device (LCD) whose pixels are arranged in columns. Image information is supplied to the SLM 4 is such a way that two stereoscopic view are spatially multiplexed on the SLM 4. In particular, alternate columns of the pixels display vertical strips of alternate ones of the stereoscopic views. A parallax element 5 in the form of the parallax barrier is disposed in front of the SLM 4. The parallax barrier 5 comprises vertically extending slits which are parallel and evenly spaced laterally. Each slit of the parallax barrier 5 corresponds to two columns of pixels of the SLM 4.

The display further comprises a second backlight 11, a second mask set 12, a second lenticular sheet 13, a second SLM 14 and a second parallax element 15 of the same type and arrangement as the devices 1 to 5, respectively. A beamcombiner 6 is arranged such that light from the devices 1 to 5 is transmitted whereas light from the devices 11 to 15 is reflected towards viewing windows 7. The beamcombiner 6 may, for example, comprise a partially silvered mirror having chromatic properties so that the color of the transmitted light matches that of the reflected light. This may be achieved by providing an appropriate optical coating on the beamcombiner 6 and/or by adjusting the color balances or "gammas" of the LCDs forming the SLMs 4 and 14. Further, the compact illuminator intensities are matched so that the illumination of the viewing windows matches.

FIG. 2 illustrates the compact illuminator 1,2,3 together with the light paths which it produces. Each of the lenticules of the lenticular sheet 3 forms images of the two associated slits of the mask set 2 as illustrated by illumination regions or "first notional viewing windows" 8. The pitch of the lenticules of the lenticular sheet 3 is slightly less than twice the pitch of the slits of the mask set 2 to provide view point compensation so that the images of the groups of two slits are coincident at the first notional viewing windows 8. The lateral width or extent of the windows 8 is substantially equal to half the average inter-ocular separation and hence is approximately 32 mm. The windows 8 are laterally spaced apart by the same amount.

The lateral width or extent of a viewing window is defined as the lateral width w(x) for which the light intensity in the window is greater than x % of the peak or maximum light intensity in the window, where x is less than 100. Although x may be chosen arbitrarily, very low values should be avoided because the intensity can be distorted by effects such as crosstalk between windows, scattering of light, etc.

The compact illuminator 11,12,13 operates in the same way but the light paths are bent by reflection at the beamcombiner 6. The relative positions and orientations of the compact illuminators and the beamcombiner are such that the illumination regions from the compact illuminators alternate laterally with each other in a common plane to form the actual viewing windows 7. The first windows 8a and 8b from the compact illuminator 1,2,3 are shown in FIG. 1 whereas the first windows formed by the compact illuminator 11,12,13 are shown at 8c and 8d.

FIG. 3 illustrates an alternative form of illumination system comprising diffuse light sources 9 of defined spatial extent imaged by a field lens 10 of optically converging type at the first notional viewing windows 8. The field lens 10 may, for example, be a Fresnel lens and is of the cylindrically or spherically converging type.

FIG. 4a illustrates another type of directional illumination system. The system comprises a holographic optical element 16 provided with input illumination 17 from an appropriate light source, such as a collimated light source. The holographic optical element 16 is of uniform type and generates the first notional viewing windows 8.

FIG. 4b illustrates a similar directional illumination system but with a dual spatially multiplexed holographic optical element 16. Each sub-section of the element 16 generates one of the two windows 8.

Figure 5:
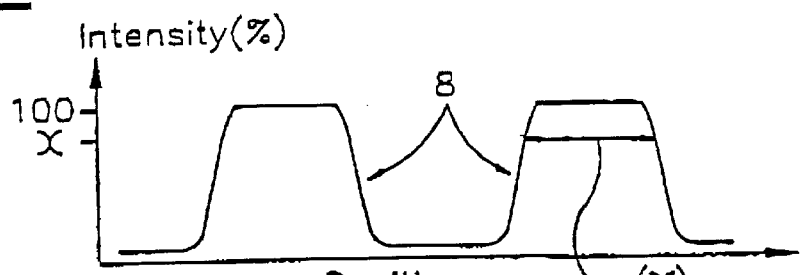
FIG. 5a illustrates a viewing window illumination profile produced by a directional illumination system of the type shown in FIG. 2.
FIG. 5b illustrates visibility profiles at the viewing windows of adjacent pixel sets produced by a spatial light modulator and parallax barrier.
FIG. 5c illustrates the viewing window performance achieved by combining the profiles of FIGS. 5a and 5b.
Figure 5:
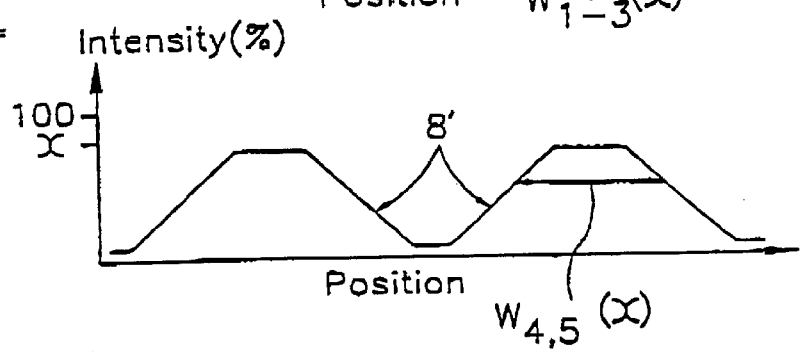
Figure 5:
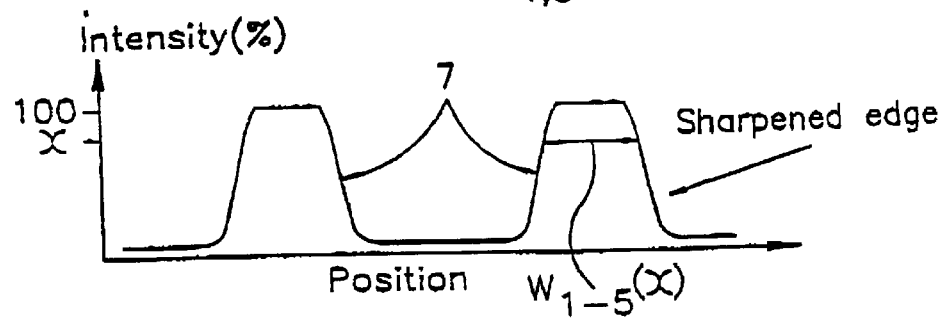

FIG. 5a illustrates the intensity profile of the first notional viewing windows generated by the illumination system such as 1,2,3 at the plane of the viewing windows 7. This is the intensity profile which would be produced, for example, by the illumination system 1,2,3 of FIG. 1 if the SLM 4 and the parallax barrier 5 were omitted. The directional illumination system, which images the light sources at the viewing windows 7, generates an intensity profile for each window of good central uniformity with sharp edges. However, undesirably high crosstalk levels between windows may be produced, for instance, because of light scatter or non-perfect surface quality. Although such crosstalk may be less than 5%, it is still highly visible to an observer and is an important source of viewing discomfort and eye fatigue.

FIG. 5b illustrates the optical performance of the LCD 4 and the parallax barrier 5. In particular, FIG. 5b illustrates second notional viewing windows 8' in the form of an intensity profile which would be produced, for example, by the SLM 4 and the parallax barrier 5 if the directional illumination system 1,2,3 were replaced by a non-directional illumination source and all the pixels of the SLM 4 were in their maximally transmissive optical state. This profile corresponds directly to the degree of visibility at the window plane of sets of pixels of the SLM 4 which display the two sets of image data. Each of the sets of pixels is disposed in alternate columns of the SLM 4.

The parallax barrier 5, which may be disposed in front of the LCD 4 as shown (or behind the LCD 4) restricts visibility from the plane of the viewing windows 7 such that light from adjacent pixel columns are restricted to adjacent second notional viewing windows 8'. If an eye of an observer is in one 32 mm wide window 8', it receives light from every second pixel column whereas an eye in an adjacent window 8' receives light from the other pixel columns. The directional illuminators 1, 2, 3 and 11, 12, 13 distribute illumination whereas the parallax elements 5 and 15 cooperate with the SLMs 4 and 14 to restrict access to the image information. The parallax elements 5 and 15 do not shape the first notional viewing windows 8 but merely restrict which pixels of the SLMs 4, 14 are visible within each notional window 8.

FIG. 5c illustrates the actual viewing windows 7 in the form of an intensity profile produced, for example, by the directional illumination system 1, 2, 3, the SLM 4 and the parallax barrier 5 of FIG. 1 with all of the pixels of the SLM in their maximally transmissive optical state. The parallax barriers provide good crosstalk performance (if strong diffraction is avoided by choosing a suitably wide slit width) because of the very high contrast ratio and excellent surface quality. As shown in FIG. 5b, such parallax elements are not capable of producing sharp-edged viewing regions. Accordingly, the combination of the directional illumination system and the parallax optic provides evenly illuminated viewing windows 7 with sharp edges and with low crosstalk.

The lateral extend $W_{1-5}$ (x) (as defined hereinbefore) of the actual viewing window 7 is given by:

$$W_{1-5}(x)=W_{1-3}(x).W_{4,5}(x)$$

where W1-3 (x) is the lateral extent of the first notional viewing windows 8 and $W_{4,5}$ (x) is the lateral extent of the second notional viewing windows 8'. This expression is valid for all values of x less than 100 and greater than for the "base regions" of the window profiles which are contaminated, for example by the effects of crosstalk. For example, x may be greater than five. Also, for all such values of x, $W_{1-5}$ (x) is less than $W_{1-3}$ (x) and less than $W_{4,5}$ (x).

Figure 6:
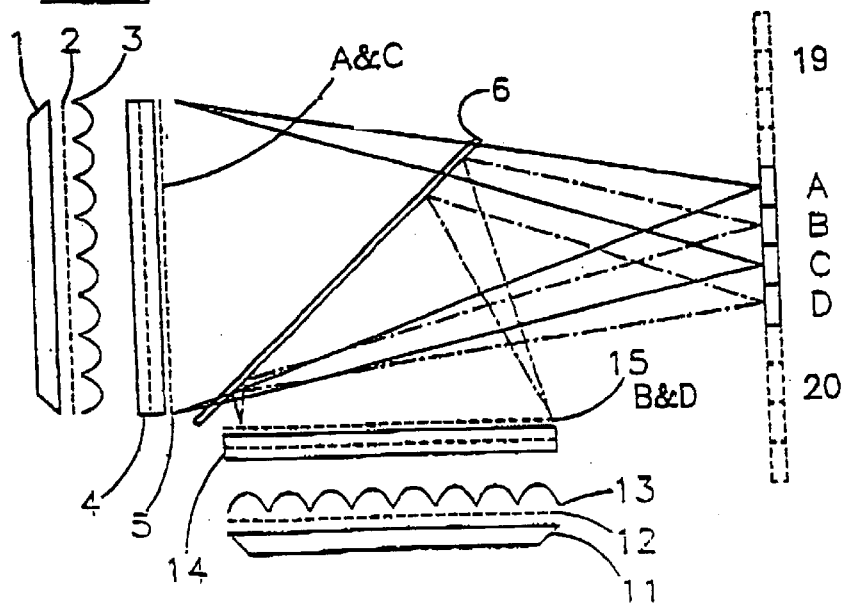
FIG. 6 is a diagrammatic plan view of the display of FIG. 1 illustrating the creation of contiguous viewing windows in contiguous lobes.

FIG. 6 illustrates how the display of FIG. 1 may generate more viewing windows. The SLM 4 is illustrated as providing pixel sets A and C whereas the SLM 14 is illustrated as providing pixel sets B and D. The viewing windows in which these pixels sets are visible are likewise indicated by A, B, C and D.

In addition to the images formed by each lenticule of the lenticular sheets 3 and 13 and the corresponding groups of sets of the mask sets 2 and 12, each lenticule forms images of the adjacent groups of slits in adjacent lobes of order +1 and −1 as illustrated in FIGS. 6 at 19 and 20. The windows and the view information contained therein are therefore repeated laterally on either side of the viewing windows A to D. The width and pitch of the viewing windows produced by the display are such that the viewing windows are substantially laterally contiguous within each lobe and the lobes are themselves substantially laterally contiguous. The uniform illumination therefore allows an observer to move between viewing regions and lobes with little or no undesirable visual artifacts. For instance, if the SLMs 4 and 14 were displaying the same image information in all of the viewing windows 7, it would be possible for an observer to move the eyes between the viewing windows 7 without substantially noticeable flicker.

The generation of multiple lobes occurs naturally in the case of directional illumination systems using mask sets and lenticular sheets shown in FIGS. 1 and 6. Similarly, the holographic optical elements 16 shown in FIGS. 4a and 4b may be arranged to generate the repeating pattern. In the case of the illumination system illustrated in the FIG. 3, the generation of multiple lobes may be achieved by repeating the pattern of light sources 9 with uniform lateral pitch.

Figure 7:
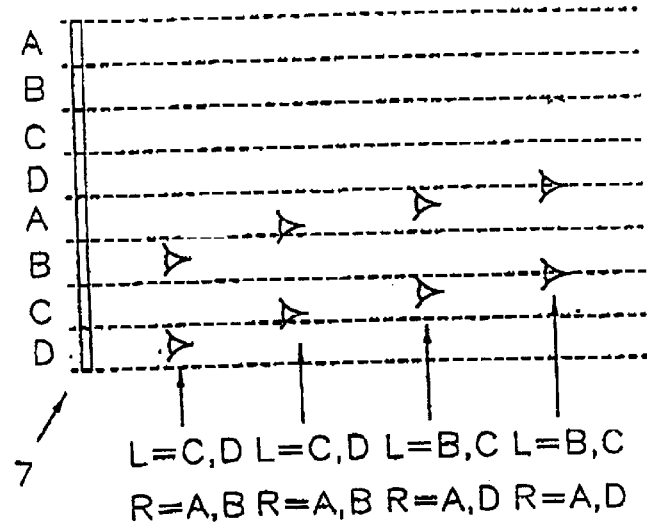
FIG. 7 is a diagram illustrating lateral observer tracking for the viewing windows shown in FIG. 6.

In order to increase the viewing freedom so that an observer can perceive a 3D image throughout an extended viewing region, electronic observer tracking may be provided as disclosed in EP 0 726 482, GB 2 297 876, EP 0 721 131 and GB 2 296 617. FIG. 7 illustrates how lateral tracking of observer position may be performed. The viewing windows in two lobes are illustrated at A to D with the relative lateral positions of the eyes of an observer being shown for four observer positions. The pixel set which is visible in each viewing window is also indicated by the same letter, so that the pixel set A is visible in the viewing window A and so on.

In the first observer position, the left eye of the observer is in the viewing window D and the right eye of the observer is in the viewing window B of one of the lobes. Left image information is displayed by the pixel sets C and D whereas right image information is displayed by the pixel sets A and B. In the next position, the left eye has just moved into the viewing window C whereas the right eye has just moved into the viewing window A. It is therefore not necessary to change the image information displayed by the pixel sets.

In the next observer position, the left eye is in the middle of the viewing window C and the right eye is in the middle of the viewing window A. The image data are changed such that left image information is displayed by the pixel sets B and C whereas right image information is displayed by the pixel sets A and D. The final illustrated observer position is such that the left eye is at the boundary between the viewing windows B and C of the first lobe whereas the right eye is at the boundary between the viewing window A of the first lobe and the viewing window D of the second lobe. The left and right eyes of the observer therefore continue to see the left and right views, respectively, as the observer moves further to the right without having to change the image data displayed by the pixel sets.

The resolution of the image seen by each eye of the observer is half the spatial resolution of each of the SLMs 4 and 14. The perceived resolution is therefore twice that which would be seen on a display using a single SLM. Further, viewing freedom tracking tolerances are improved with respect to a three window tracking system. In such a system, the closest an eye would theoretically approach a window boundary under normal operation is 11 mm whereas, for the four window system illustrated in FIG. 8, this is increased to 16 mm. Accordingly, the tracking system accuracy and speed may be relaxed and/or improved performance may be achieved with existing components and controls.

Figure 8:
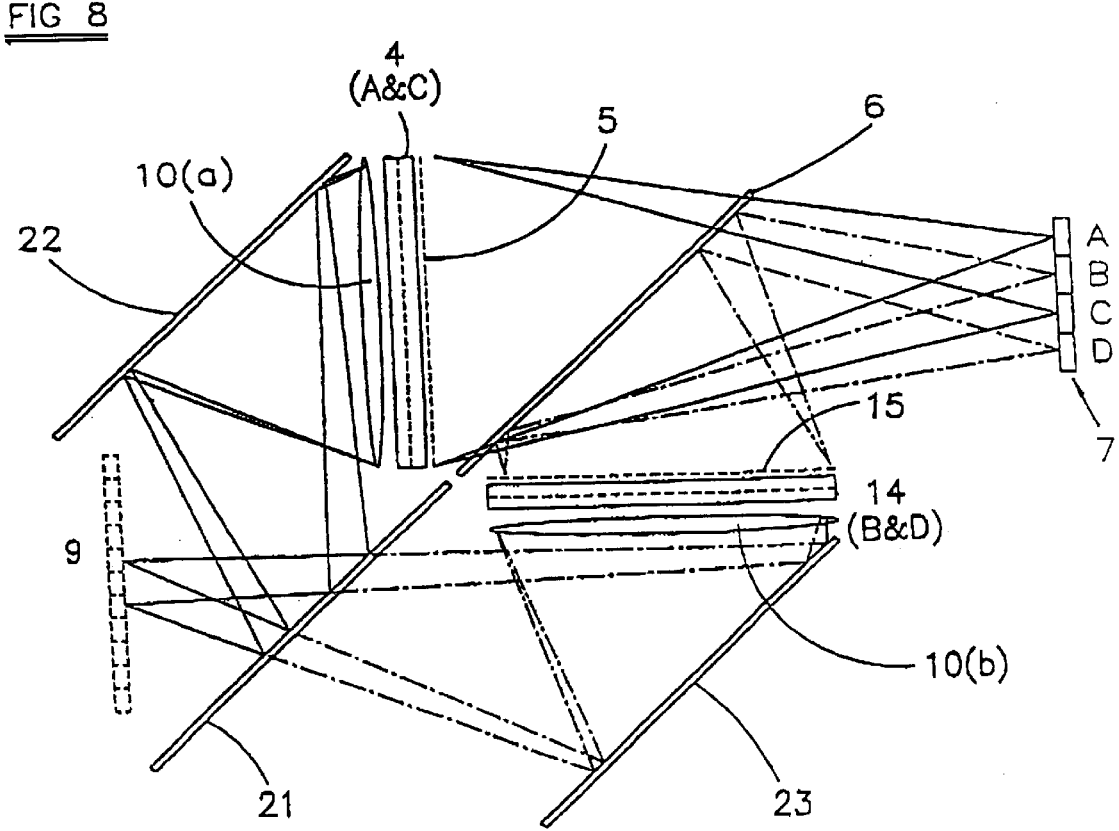
FIG. 8 is a diagrammatic plan view of an autostereoscopic 3D display constituting a second embodiment of the invention.

FIG. 8 illustrates a beamcombiner display of a type similar to that illustrated in FIG. 1 but using a single set of light sources 9 to illuminate both SLMs 4 and 14. Light from the light sources 9 is directed towards a beamsplitter 21 which reflects approximately half of the light and transmits the remainder. The reflected light is reflected by a mirror 22 to a field lens in the form a large format Fresnel lens 10a, which images the light through the SLM 4, the parallax barrier 5 and the beamcombiner 6 at the viewing windows 7. Light transmitted by the beamsplitter 21 is reflected by a mirror 23 to a similar Fresnel lens 10b, which images the light through the SLM 14, the parallax barrier 5 and by reflection from the beamcombiner 6 at the viewing windows 7.

The light sources 9 are shown as comprising switchable lamps. As described hereinbefore, in order to provide a plurality of lobes, the light sources 9 have to be repeated and the lamps shown in FIG. 8 are switchable so that lamps which are not currently required during observer tracking operation may be switched off.

Figure 9:
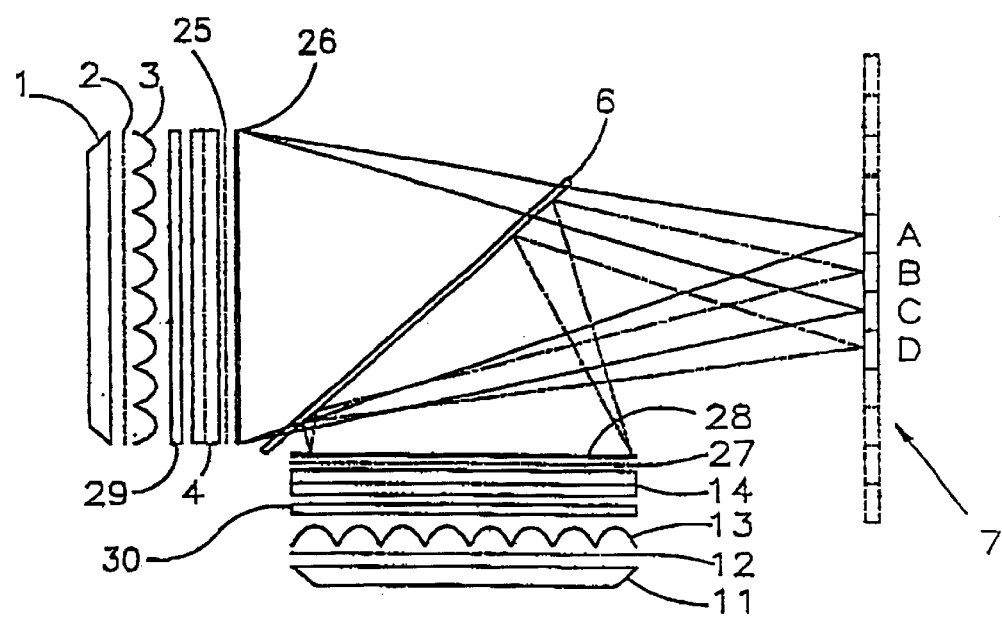
FIG. 9a is a diagrammatic plan view of an autostereoscopic 3D display constituting a third embodiment of the invention.
FIG. 9b illustrates operation of the display of FIG. 9a in a 2D or stereoscopic mode.

FIG. 9a shows a display of type shown in FIG. 1 but in which the parallax barriers 5 and 15 are replaced by parallax barriers of the type disclosed in EP 0 829 744, GB 2 317 295, EP 0 887 666 and GB 2 326 728. The parallax barrier for the SLM 4 comprises a polarization barrier 25 and a removable polarizer 26. The polarization barrier 25 comprises slit regions which rotate the polarization of light from the SLM 4 by 900 separated by barrier regions which do not alter the polarization. For instance, the SLM 4 may comprise an LCD having a linear output polarizer so that light incident on the polarization barrier 25 has a defined linear polarization. The removable polarizer 26 has a polarizing direction such that light from the slit regions of the barrier 25 is transmitted whereas light from the barrier regions is extinguished. Alternatively, the polarizers 26 and 28 can be combined into a single polarizer positioned at the output of the display, positioned after the beamcombiner 6.

Similarly, the parallax barrier associated with the SLM 14 comprises a polarization barrier 27 and a removable polarizer 26 of the same type as the barrier 25 and the polarizer 26, respectively.

The display further comprises a switchable diffuser 29 disposed between the lenticular sheet 3 and the SLM 4 and a switchable diffuser 30 disposed between the lenticular sheet 13 and the SLM 14. The diffusers 29 and 30 may, for example, comprise diffuser sheets which may be physically inserted into and removed from the optical paths through the display. Alternatively, the diffusers may be electronically controlled so as to be switchable between low and high diffusion states. An example of such a device is a polymer dispersed liquid crystal (PDLC).

FIG. 9a illustrates operation of the display in the autostereoscopic 3D mode. The diffusers 29 and 30 are in the low diffusion or clear state and the polarizers 26 and 27 are in place. Thus, the diffusers 29 and 30 have no substantial effect on operation of the display whereas the polarization barriers 25 and 27 and the removable polarizers 26 and 28 act as parallax barriers in front of the SLMs 4 and 14. Operation of the display is therefore as described hereinbefore.

FIG. 9b illustrates operation of the display in a stereoscopic 3D mode or in a high resolution 2D mode. The removable polarizers 26 and 28 have been removed and the diffusers 29 and 30 have been switched to the diffusing state. Removal of the polarizers 26 and 28 disables the parallax barriers whereas operation of the diffusers 29 and 30 in the diffusing state causes the illumination system to become non-directional. Thus, all of the pixels of both SLMs 4 and 14 are visible throughout and extended viewing region as indicated at 30. When viewed without viewing aids, both eyes of the observer see the whole of the SLMs 4 and 14, so that a 2D image of twice the spatial resolution of each of the SLMs 4 and 14 may be displayed. Alternatively, if output polarizers of the SLMs 4 and 14 are arranged so as to provide orthogonal polarizations, the display may be used stereoscopically through suitable polarizing glasses throughout a wide viewing region.

Figure 10:
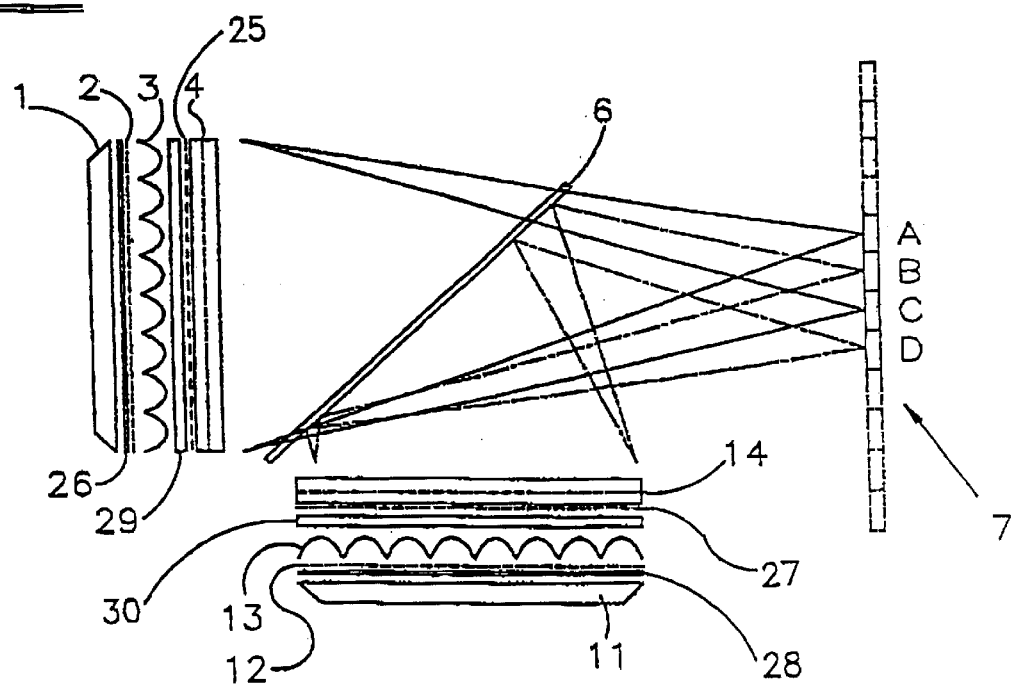
FIG. 10a is a diagrammatic plan view of an autostereoscopic 3D display constituting a fourth embodiment of the invention.
FIG. 10b illustrates operation of the display of FIG. 10a in a 2D or stereoscopic mode.
Figure 9:
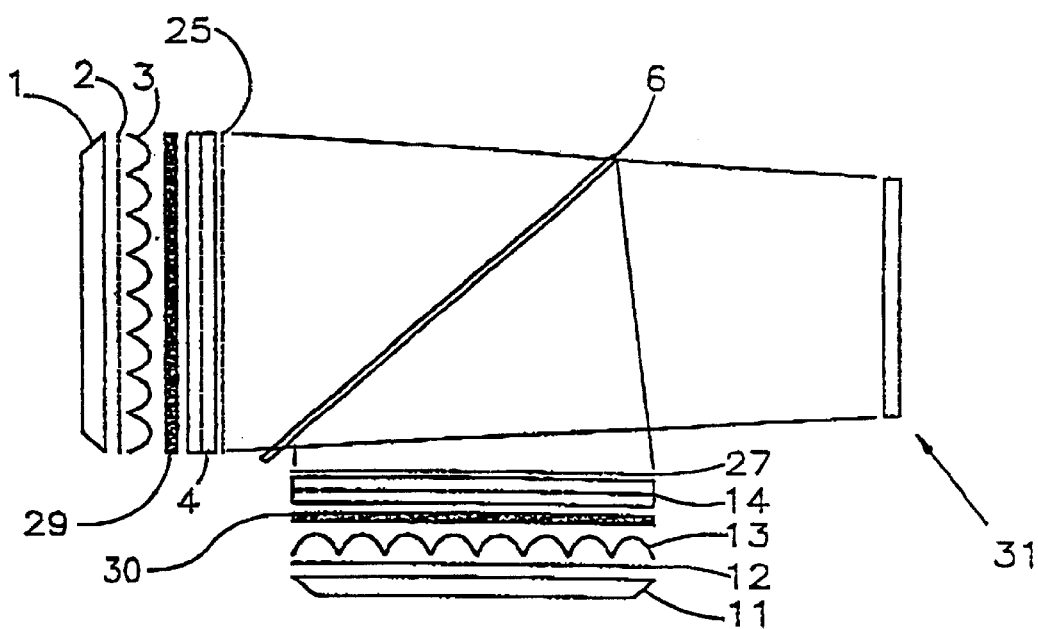
Figure 10:
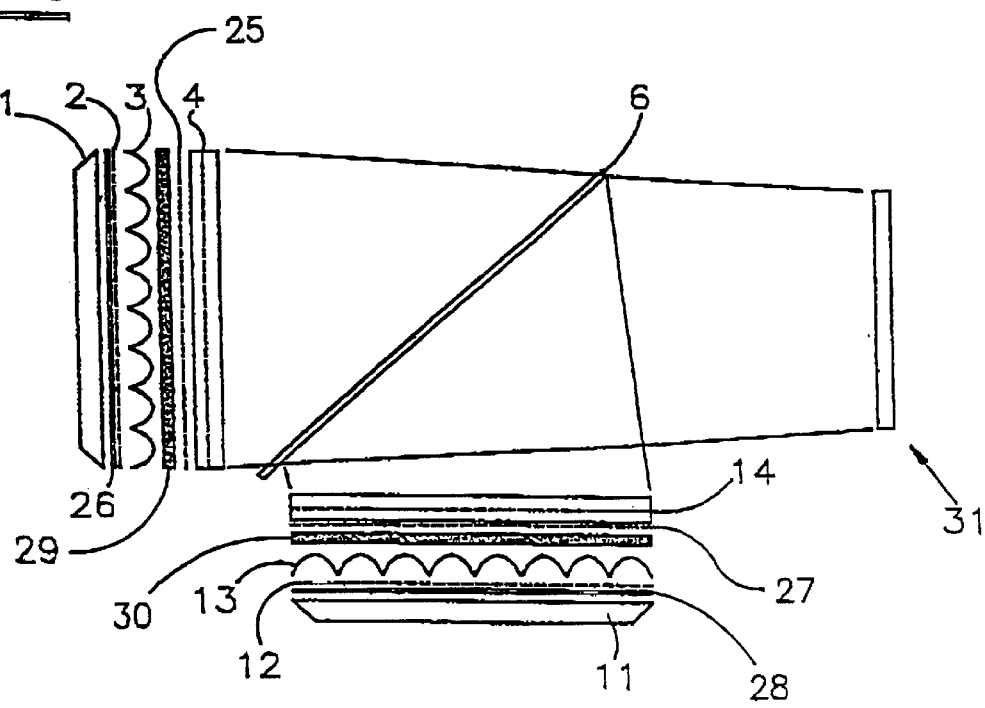

Whereas the display illustrated in FIGS. 9a and 9b is of the front parallax barrier type, the display illustrated in FIGS. 10a and 10b is of the rear parallax barrier type. Thus, the polarization barrier 25 is disposed between the SLM 4 and the switchable diffuser 29 whereas the polarization barrier 27 is disposed between the SLM 14 and the switchable diffuser 30. The polarizer 26 is fixed and is disposed between the back light 1 and the mask set 2 whereas the polarizer 28 is fixed or permanently in the optical path and is disposed between the back light 11 and the mask set 12.

FIG. 10a illustrates the autostereoscopic 3D mode of operation, in which the diffusers 29 and 30 are in the clear state. Operation is substantially described hereinbefore.

FIG. 10b illustrates operation in the stereoscopic 3D mode or in the 2D mode. The switchable diffusers 29 and 30 are in the diffusing state. This has two effects. First of all, the directionality of the compact illuminators is destroyed. Secondly, polarized light from the polarizers 26 and 27 is depolarized so that the polarization barriers 25 and 27 cease to act as parallax barriers. Thus, operation in this mode is substantially the same as the operation described hereinbefore with reference to FIG. 9b.

Figure 11:
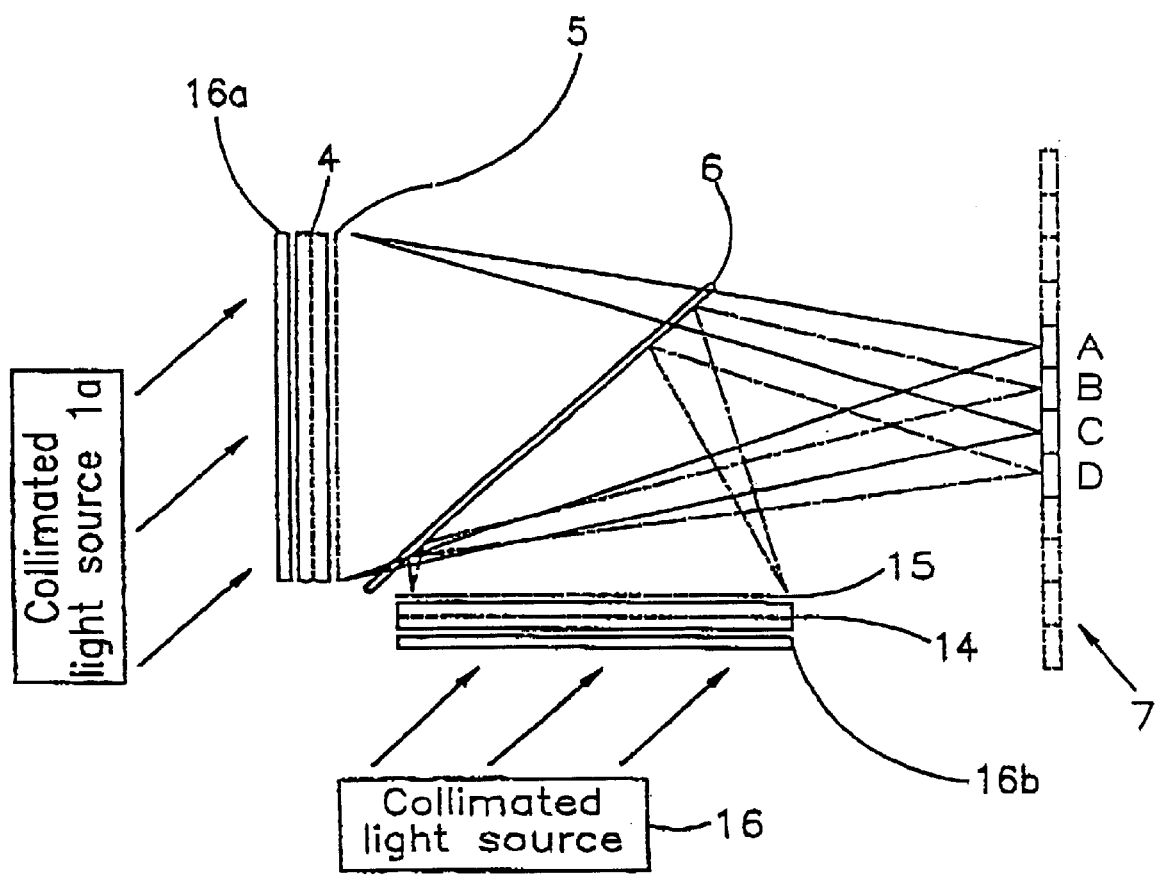
FIG. 11 is a diagrammatic plan view of an autostereoscopic 3D display constituting a fifth embodiment of the invention.

The display shown in FIG. 11 differs from that shown in FIG. 1 in that the compact illuminators are replaced by holographic optical elements 16a and 16b together with collimated light sources 1a and 1b to provide directional illuminators of the type illustrated in FIG. 4a or 4b. An advantage of holographic optical elements over conventional optics is that the off-axis viewing zones may be produced without increased aberrations associated with off-axis imaging from conventional optical systems. Although the light sources 1a and 1b are shown as being collimated, other types of sources may be used so that the rear illumination of the elements 16a, 16b corresponds to the recording wave-fronts of the holograms.

Figure 12:
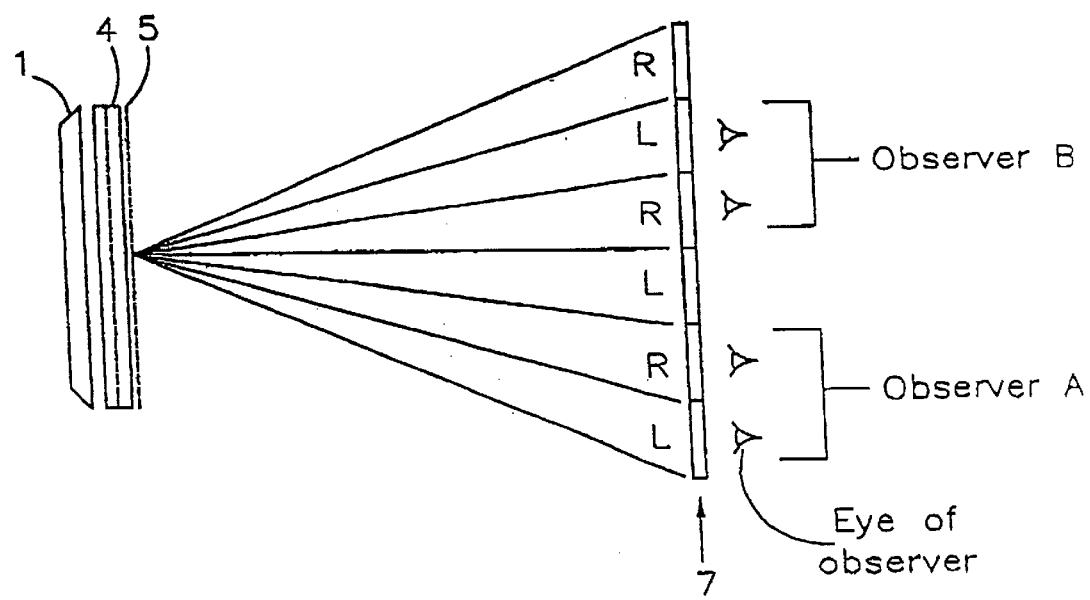
FIG. 12 is a diagrammatic plan view of an autostereoscopic 3D display of known type illustrating the presence of pseudoscopic viewing zones.

FIG. 12 illustrates a known type of single panel autostereoscopic 3D display of the front parallax barrier type. The viewing windows generated by this display are shown at 7 with L indicating windows where left eye views are visible and R indicating windows where right eye views are visible. Provided the left and right eyes of an observer are disposed in left and right viewing windows, respectively, as shown for observer A, the observer will correctly perceive the 3D image being displayed (orthoscopic viewing). However, an observer may be positioned with the left eye in a right window and the right eye in a left window as illustrated for observer B. This is termed pseudoscopic viewing and gives a confusing impression which is uncomfortable and may lead to false depth information. It can be difficult for untrained observers to distinguish between orthoscopic and pseudoscopic viewing.

Figure 13:
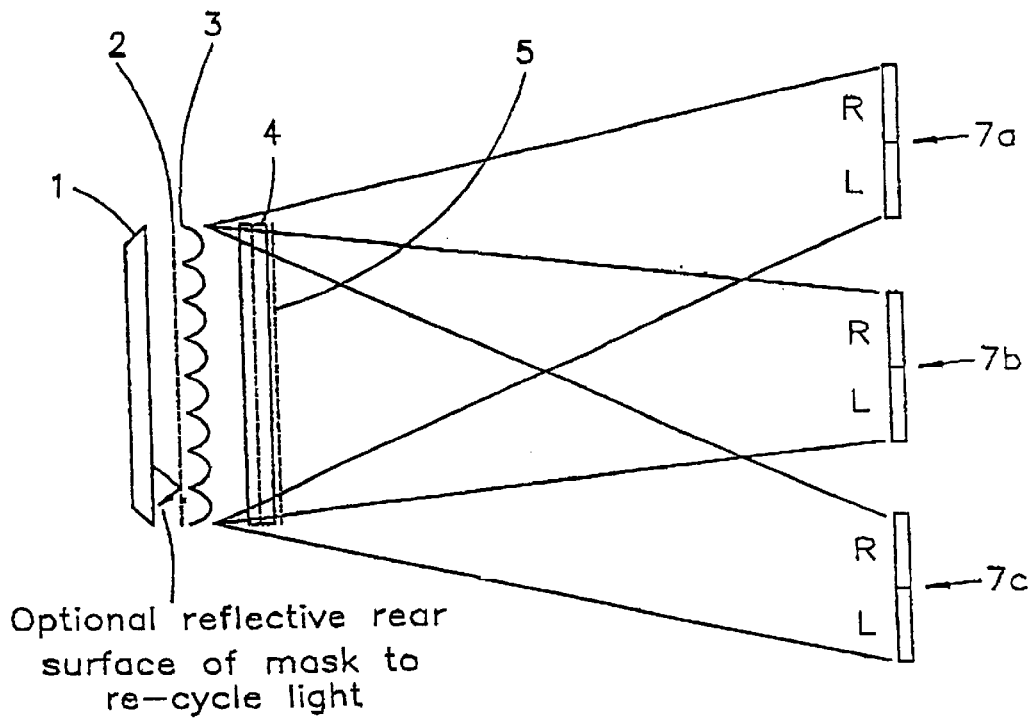
FIG. 13 is a diagrammatic plan view of an autostereoscopic 3D display constituting a sixth embodiment of the invention.

FIG. 13 illustrates a single panel autostereoscopic 3D display having a compact illuminator 1,2,3 of the type illustrated in FIG. 1 for forming three pairs of discrete spaced viewing windows 7a, 7b and 7c. The display further comprises a single SLM 4 and a single parallax barrier 5 of the type illustrated in FIG. 1 for providing a two-view display. The rear surface of the mask 2 is made reflective to permit light to be recycled so as to improve the illumination efficiency of the display.

The display is illustrated in FIG. 13 as producing the viewing windows 7a, 7b and 7c such that there is a non-illuminated gap substantially equal to the average interocular spacing between adjacent viewing windows. It is therefore impossible for an observer to be in a pseudoscopic viewing position in the plane of the viewing windows so that pseudoscopic viewing is impossible.

FIG. 14 illustrates at 32 the pattern of windows produced by the combination of the SLM 4 and the parallax barrier 5. The illumination profile produced by the compact illuminator is illustrated at 33 and the resultant information distribution is illustrated at 34. Because alternate pairs of viewing windows are suppressed, pseudoscopic viewing is prevented so that the display is easier to use by an untrained observer. Further, the display exhibits lower crosstalk than for conventional displays of the type illustrated in FIG. 12. In particular, light which would otherwise spread from adjacent windows on both sides of a window of interest, thus causing crosstalk, is reduced because each effective viewing window has only one adjacent illuminated window, the window on the other side being suppressed by the lack of illumination. Light can only spread from one side so that the amount of crosstalk is substantially halved. Undesirable visual artifacts resulting from crosstalk are therefore substantially reduced.

Figure 15:
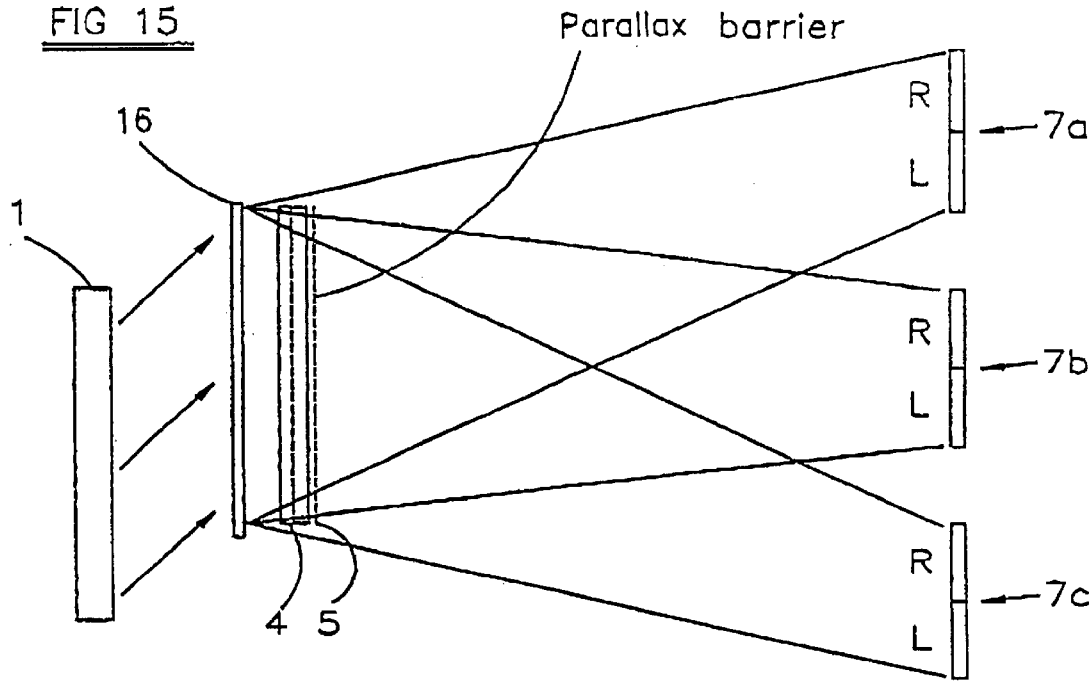
FIG. 15 is a diagrammatic plan view of an autostereoscopic 3D display constituting a seventh embodiment of the invention.

Any of the previously described directional illumination systems may be used and FIG. 15 illustrates a display of the type shown in FIG. 13 with the compact illuminator replaced by a holographic illumination system of the type illustrated in FIG. 11 and comprising a collimated light source 1 and a holographic optical element 16.

Figure 16:
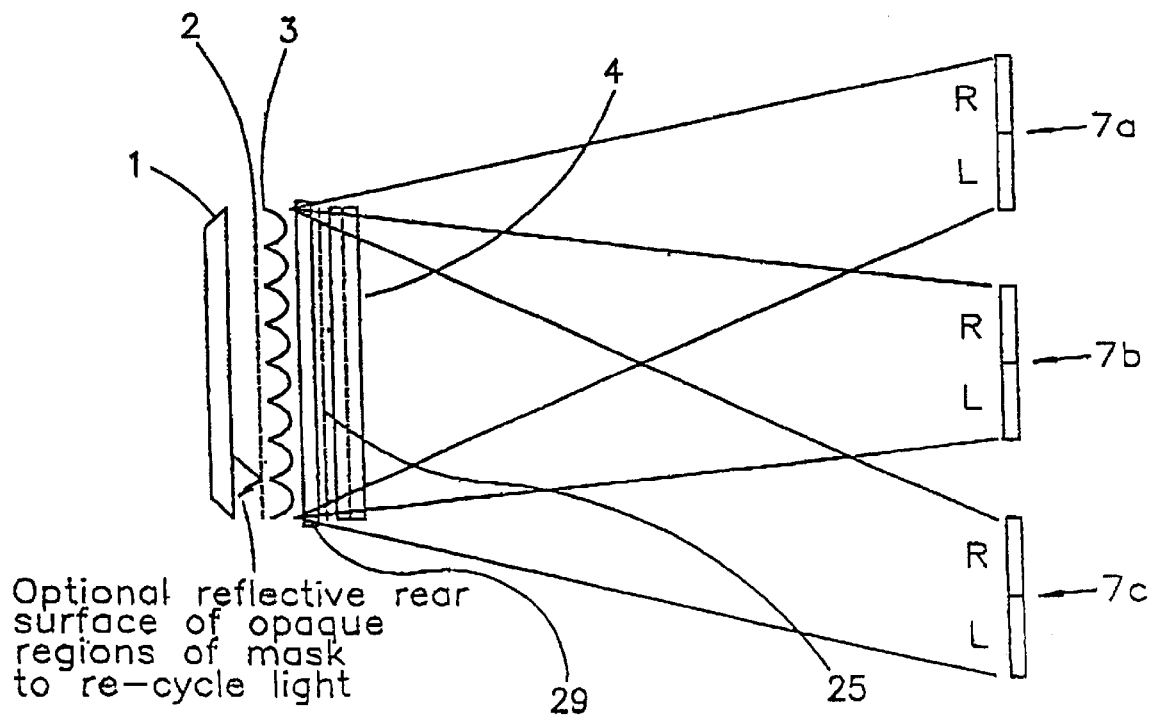
FIG. 16 is a diagrammatic plan view of an autostereoscopic 3D display constituting and eighth embodiment of the invention.

FIG. 16 illustrates the display of the type shown in FIG. 13 but of the rear parallax barrier type in which the parallax barrier is formed by a polarization barrier 25 of the same type as described with reference to FIGS. 9a to 10b. The polarization barrier 25 cooperates with an input polarizer of the SLM 4 to act as a parallax barrier when receiving polarized light from the compact illuminator 1, 2, 3. The compact illuminator differs from that shown in FIG. 10a in that the polarizer is combined with the mask 2 such that the mask comprises strips of polarizer sheet separated by opaque strips. With the switchable diffuser element 29 in the non-diffusing mode, the display operates in the 3D autostereoscopic mode as described hereinbefore with reference to FIG. 13.

Figure 17:
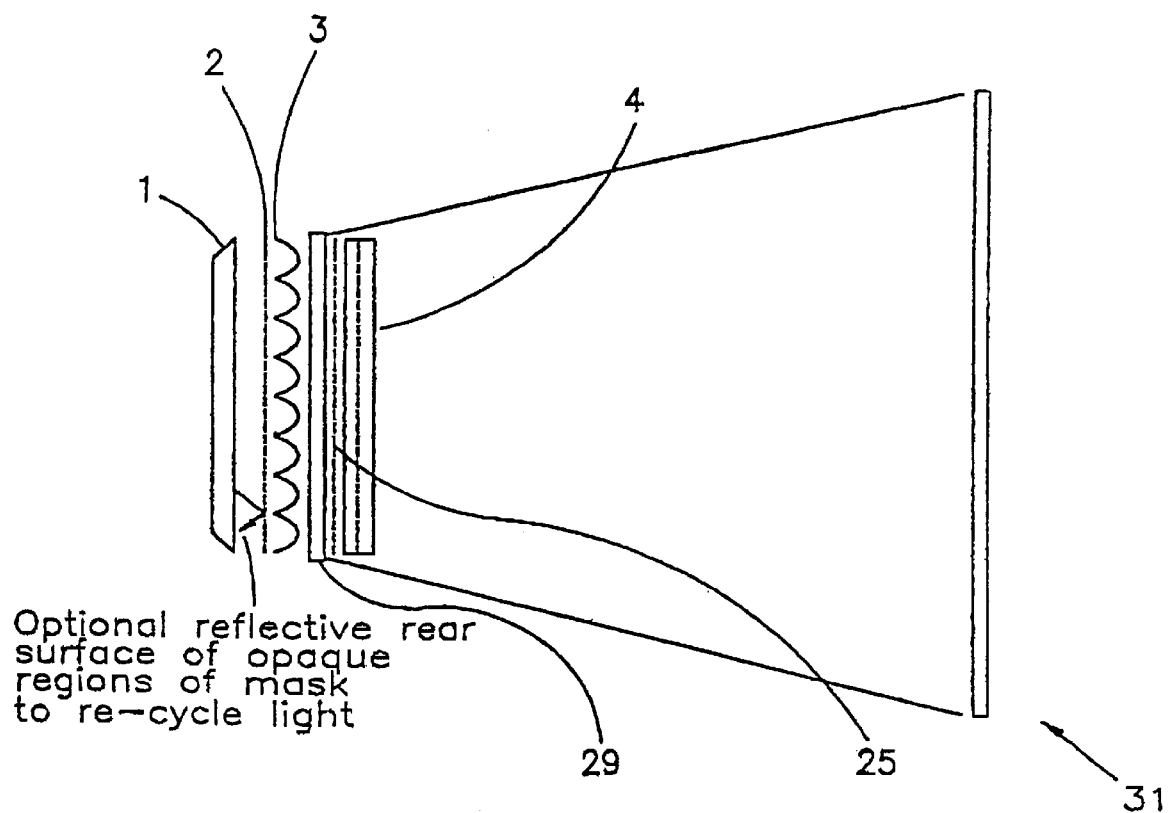
FIG. 17 illustrates operation of the display of FIG. 16 in a 2D mode.

FIG. 17 illustrates the display of FIG. 16 operating in a 2D mode. The diffuser 29 is switched to the diffusing mode so as to destroy the polarization produced by the polarized mask 2 and so as to destroy the directionality of the illuminator 1,2,3. The parallax barrier is thus rendered ineffective and the illuminator 1,2,3 act as a near-Lambertian light source to allow a full resolution 2D image to be viewed over a wide range of angles.

INDUSTRIAL APPLICABILITY

According to the present invention as set forth above, it is thus possible to provide a directional display in which directional illumination creates illumination zones with light passing through the whole area of a directional display panel. The directional display panel defines the image information content visible in the whole or part of the illumination zones. By using imaging optical elements to provide the directional illumination, improved illumination zone profiles can be achieved such that uniform illumination is provided in a central part of the illumination zone and the zone has sharp edges. The use of a parallax optic such as a parallax barrier to define the information content of the zones provides low levels of crosstalk.

It is further possible to provide an electronically tracked autostereoscopic 3D display of the beamcombiner type. Such an arrangement requires no moving parts and results in little or no visual flicker artifacts during observer tracking. A four-window system can be provided for enhanced tolerances during tracking. Longitudinal tracking by means of view slicing can be provided and fast observer tracking at video input rates can be achieved. An image resolution equal to half the spatial resolution of the spatial light modulator can be provided. The spatial light modulator may be embodied by standard liquid crystal displays without requiring any modification. Such an arrangement can make use of the same display interfacing as other flat panel two-view interlaced displays. In the case of a parallax barrier as the parallax optic, wide slits may be adopted so as to improve light efficiency and reduce diffraction effects. All of the elements may be fixed in position during manufacture so as to provide a rugged display. Stereoscopic and 2D modes of operation may easily be provided in some embodiments.

It is possible to eliminate pseudoscopic viewing regions, for instance for fixed observer position to two-view autostereoscopic displays. Such arrangements can have reduced crosstalk and may be electronically switchable to a 2D mode.

Further, it is not necessary to provide any viewer position indication because even inexperienced observers have no substantial difficulty in correctly locating themselves with respect to the viewing regions.

What is claimed is:

1. A directional display comprising:
   a spatial light modulator;
   a directional illumination system for directing light through the modulator; and a parallax optic associated with the modulator, wherein:
the illumination system directs light towards a plurality of first notional viewing windows, each of which has a first lateral extent;
the parallax optic cooperates with the modulator so that non-directional illumination of the modulator would result in the formation of second notional viewing windows, each of which has a second lateral extent; and
the modulator, the illumination system and the parallax optic cooperate to form actual viewing windows, each of which has a lateral extent which is equal to the product of the first and second lateral extents and is less than each of the first and second lateral extents.

2. A display according to claim 1, wherein the illumination system comprises at least one illumination source and an imaging system.

3. A display according to claim 2, wherein the illumination system comprises a plurality of discrete light sources.

4. A display according to claim 3, wherein the imaging system comprises a field lens.

5. A display according to claim 2, wherein the illumination system comprises a backlight and a mask having a plurality of slits defining the illumination sources.

6. A display according to claim 5, wherein regions of the mask between the slits are reflective towards the backlight.

7. A display according to claim 5, wherein the imaging system comprises a lenticular screen.

8. A display according to claim 7, wherein each lenticule of the lenticular screen cooperates with a group of slits to image the slits in a plurality of lobes in respective viewing windows.

9. A display according to claim 2, wherein the imaging system comprises at least one holographic optical element.

10. A display according to claim 9, wherein the illumination source comprises a collimated light source.

11. A display according to claim 2, wherein the viewing windows are laterally contiguous.

12. A display according to claim 2, wherein the viewing windows comprise laterally spaced pairs of laterally contiguous viewing windows.

13. A display according to claim 1, wherein the parallax optic comprises a parallax barrier.

14. A display according to claim 1, wherein the spatial light modulator comprises first and second spatial light modulators, the parallax optic comprises first and second parallax optics cooperating with the first and second spatial light modulators, respectively, and the display comprises a beamcombiner for combining output light from the first and second spatial light modulators.

15. A display according to claim 14, wherein the illumination systems comprises a plurality of discrete light sources and a beamsplitter for directing light from the light sources towards the first and second spatial light modulators.

16. A display according to claim 1, further comprising a switchable diffuser cooperating with the spatial light modulator and switchable between a non-diffusing state to provide a directional display mode and a diffusing state to provide a non-directional display mode.

* * * * *